June 26, 1928.
E. C. BUCK
1,675,158
ATTACHMENT FOR ABNEY LEVELS
Filed April 10, 1926
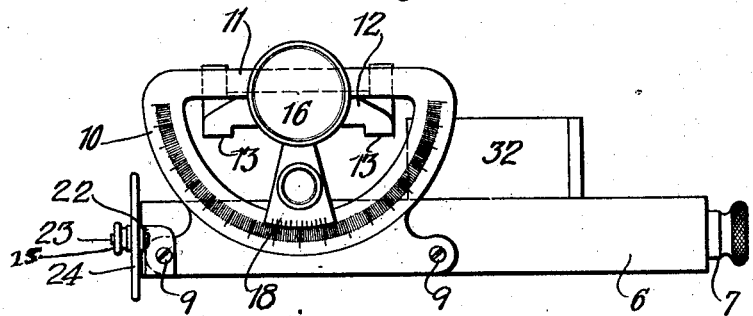
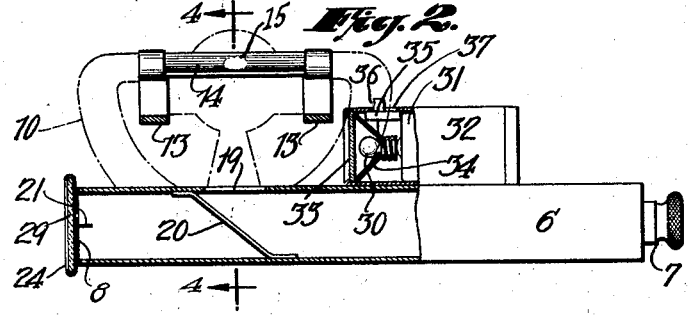
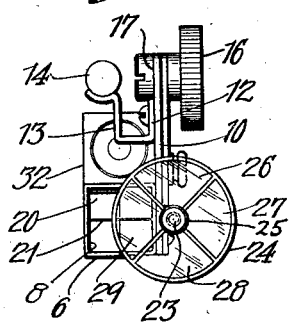
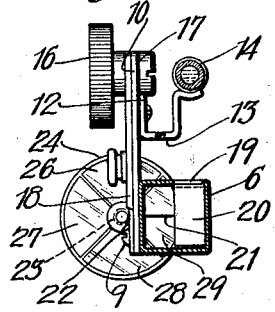
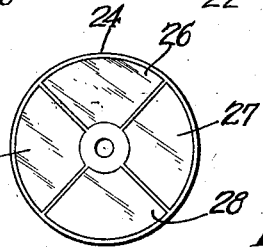
Inventor
EDWARD C. BUCK.
By His Attorney
Philip C. Peck Patented June 26, 1928.

1,675,158

UNITED STATES PATENT OFFICE.

EDWARD C. BUCK, OF PORT OF SPAIN, TRINIDAD, BRITISH WEST INDIES.

ATTACHMENT FOR ABNEY LEVELS.

Application filed April 10, 1926. Serial No. 101,066.

My invention relates more particularly to an improved attachment for use with the ordinary Abney level commonly employed by surveyors and engineers whereby such type of level equipped with my attachment may be utilized especially by mariners for taking the altitude of the sun or any of the heavenly bodies as is customarily done with the sextant.

The objects of my invention are, among other things, to provide an improved form of attachment to be used with the Abney level, more particularly for use by the mariner in sighting the sun, such attachment embodying a disk wheel carrying a series of variably tinted glass plates arranged over the open end of the sight tube so that the sun's rays shall be dimmed sufficiently to enable the mariner to make careful observations without blinding or inconvenience from the intensity of the sun's rays. Since under different weather conditions, the sun's rays are of variable brightness, I have provided this novel attachment which enables the observer to place instantly between his eye and the sun a glass of suitable translucency to enable the mariner to make accurate and careful observations by employing the Abney level.

Further features of invention will hereinafter be described and then particularly pointed out in the appended claims.

In the drawings showing an embodiment of my invention, Fig. 1 is a side elevation of the Abney level equipped with my improved attachment;

Fig. 2 is another side view partly in longitudinal vertical section showing the arrangement of the different parts;

Fig. 3 is an end view looking from the left in Fig. 1;

Fig. 4 is a sectional view taken on the line 4—4 of Fig. 2; and

Fig. 5 is a detail view of the disk wheel having sectors formed of glasses of variable density or translucency.

Similar numerals refer to similar parts throughout the several figures.

Referring to the drawings the tubular body 6 of the level forming the sight tube is preferably square in cross-section (Figs. 3 and 4) and is provided with the telescopic eye-piece 7 adjustably secured at one end, while the full open square bore end 8 is located at the opposite end from the eye-piece 7 as shown in Fig. 3. Attached to the side of the body 6 by the screws 9 is the fixed vernier scale 10 marked off for angles up to about 90° (Fig. 1). On the inner side of the cross-bar 11 of the scale 10 is movable plate 12 having two brackets 13 which support the ends of the small spirit level tube 14 having the bubble 15 as shown in Figs. 1–4. Adjustably secured to the cross-bar 11 by the thumb-screw 16 and bearings 17 is the small movable vernier scale 18 to coact with the vernier scale 10. The scale 18 moves with the spirit level tube 14, both devices rotating on the bearings 17 back of the thumb-screw 16. The hole 19 is formed in the top of the tubular body 6 directly below the tube 14 and inside the tubular body 6 below the hole 19 is the inclined rectangular mirror 20 which extends sidewise half way across the bore of the body 6 (Fig. 4) so as to enable the observer to look past the mirror 20 toward the desired object. The cross-wire 21 extends across the open square end 8 of the tubular body 6 as shown in Figs. 2, 3 and 4. To obtain an observation, observer looks through the eye-piece 7 at the desired object (for example the sun) and then turns the spirit level tube 14 on its bearings 17 until the reflection of the bubble 15 appears on the mirror 20; when the cross-wire 21 cuts the object observed and also the reflection of the bubble 15 appearing on the surface of the mirror 20, the observation has been completed and the degrees of elevation or depression may be read on the vernier scale 10 affixed to the tubular body 6. All these parts have been heretofore used in constructing the Abney level and do not in themselves constitute my invention.

Near the open end 8 I have secured the bracket 22 to the tubular body 6, the bracket 22 carrying the projecting stud 23 on which is rotatably mounted the disk wheel 24 secured in any predetermined position by the thumb-screw 25 as shown in Figs. 1, 3 and 4. The disk wheel 24 comprises a series of sectors 26, 27, 28 and 29 (Fig. 5) each sector being composed of variably tinted glasses of different degrees of translucency. The disk wheel 24 may be revolved on the stud 23 so as to bring any of the different sectors 26, 27, 28 and 29 to cover the half of the open end 8 that is not in alinement with the mirror as shown in Figs. 3 and 4. In use the disk wheel 24 is rotated until a suitably tinted sector (26—29) for the conditions of work has been brought across half the open end 8. Only one-half of the open end 8 need be protected by one of the glass sectors (26—29) since the mirror 20 effectively shuts off any rays of light in the other half of the tube bore. As a matter of practice the mirror 20 is formed as a tube which may be inserted at the open end 8 and withdrawn therefrom at will to suit conditions of use. Since the brightness or intensity of the sun's rays is likely to vary momentarily due to passing clouds or for other reasons the variably tinted glass sectors of the revolving disk wheel 24 enables the observer to make the necessary observations without interruption or inconvenience.

For stellar observations I have provided a small electric bulb light 30 removably mounted on the battery 31 which is enclosed in the housing 32 attached to the top side of the tubular body 6 as shown in Figs. 1 and 2. The front end of the housing 32 carries the glass plate 33 behind which is the conical reflector 34 surrounding the bulb 30 as shown in Fig. 2. The slide-switch 35 having the knob 36 projecting through the slot 37 in the top of the housing 32 controls the lighting of the bulb 30 in the usual manner. When making observations at night with this lighting attachment, the disk wheel 24 is removed from the stud 23 so that an uninterrupted view may be obtained through the eye-piece 7 by aid of the light from the bulb 30 in reflecting the bubble 15 on the mirror 20 as has been hereinbefore described.

While the construction herein shown and described embodies my invention in a preferred form, it will be understood that changes and variations may be made in the various parts without departing from the principles and scope of my invention or sacrificing its chief advantages.

I claim as my invention:—

1. An attachment for an Abney level sight tube having a rectangular mirror positioned within the bore of the tube with its face inclined away from the open end of said tube, and covering substantially one-half of the open end of said tube, comprising a tinted glass piece secured over substantially the one-half of the open end of said tube out of alignment with said mirror.

2. An attachment for an Abney level sight tube having a rectangular mirror positioned within the bore of the tube with its face inclined away from the open end of said tube, and covering substantially one-half of the open end of said tube, comprising a series of variably tinted glass pieces selectively secured over substantially the one-half of the open end of said tube out of alignment with said mirror.

3. An attachment for an Abney level sight tube having a rectangular mirror positioned within the bore of the tube with its face inclined away from the open end of said tube, and covering substantially one-half of the open end of said tube, comprising a disk wheel having a plurality of sectors of variably tinted glass rotatably secured over that portion of the open end of said tube out of alignment with said mirror whereby any of said sectors may be brought in operative alinement with said open portion extending through the tube.

4. An attachment for an Abney level sight tube having a rectangular mirror positioned within the bore of the tube with its face inclined away from the open end of said tube, and covering substantially one-half of the open end of said tube, comprising a disk wheel having a plurality of sectors of variably tinted glass rotatably secured over that portion of the open end of said tube out of alignment with said mirror whereby any of said sectors may be brought in operative alinement with said open portion extending through the tube and means for holding said wheel in any predetermined position.

5. An attachment for an Abney level sight tube having a rectangular mirror positioned within the bore of the tube with its face inclined away from the open end of said tube, and covering substantially one-half of the open end of said tube, comprising a disk wheel having a plurality of sectors of variably tinted glass rotatably secured over that portion of the open end of said tube out of alignment with said mirror whereby any of said sectors may be brought in operative alinement with an unobstructed substantially one-half portion extending through the bore of the tube to the eye-piece.

6. An attachment for an Abney level sight tube having a rectangular mirror positioned within the bore of the tube with its face inclined away from the open end of said tube, and covering substantially one-half of the open end of said tube, comprising a disk wheel having a plurality of sectors of variably tinted glass rotatably secured over that portion of the open end of said tube out of alignment with said mirror whereby any of said sectors may be brought in operative alinement with an unobstructed substantially one-half portion extending through the bore of the tube to the eye-piece and means for holding said wheel in any predetermined position.

7. In an Abney level sight tube having a bore substantially square in cross-section, in combination, a rectangular mirror positioned in said bore to cover substantially one-half of the open end of said tube with its face inclined away from said open end, and a disk wheel having a plurality of sectors of variably tinted glass rotatably secured over the unobstructed by said mirror open end of the tube in operative alinement with the eye-piece opposite said open end.

8. In an Abney level sight tube having a bore substantially square in cross-section, in combination, a rectangular mirror positioned in said bore to cover substantially one-half of the open end of said tube with its face inclined away from said open end, and a disk wheel having a plurality of sectors of variably tinted glass of like size rotatably secured over the unobstructed by said mirror open end of the tube in operative alinement with the eye-piece opposite said open end whereby said unobstructed one-half portion is substantially covered by any one of said sectors.

EDWARD C. BUCK.